United States Patent [19]

Noggle

[11] Patent Number: 5,176,477
[45] Date of Patent: Jan. 5, 1993

[54] DRILL TOOL

[75] Inventor: Kenneth G. Noggle, W. Bloomfield, Mich.

[73] Assignee: GTE Valenite Corporation, Troy, Mich.

[21] Appl. No.: 639,451

[22] Filed: Jan. 10, 1991

[51] Int. Cl.⁵ ............................................. B23B 51/02
[52] U.S. Cl. ....................................... 408/59; 408/224; 408/713
[58] Field of Search ............... 408/713, 117, 223, 202, 408/224, 211, 119, 118, 59

[56] References Cited

U.S. PATENT DOCUMENTS

| | | | |
|---|---|---|---|
| 3,963,365 | 6/1976 | Shallenberger, Jr. | 408/713 X |
| 4,493,596 | 1/1985 | Grunsky et al. | 408/233 |
| 4,859,123 | 8/1989 | Koesashi et al. | 408/713 X |

FOREIGN PATENT DOCUMENTS

| | | | |
|---|---|---|---|
| 54913 | 6/1982 | European Pat. Off. | 408/199 |
| 2843788 | 5/1979 | Fed. Rep. of Germany | 408/211 |

*Primary Examiner*—Daniel W. Howell
*Attorney, Agent, or Firm*—Bill C. Panagos

[57] ABSTRACT

A drill is provided having a generally cylindrically shaped body. The body has a rear end structured to releasably connect with a torque transmitting machine in a conventional manner. The body has a forward end which is provided with diametrically opposed seats. Each seat releasably retains a cutting insert. Each cutting insert has a cutting edge projecting forwardly from the forward end of the body. Further, the cutting inserts are oriented so that one cutting edge is at a ten degree positive lead angle and the other cutting edge is at a five degree negative lead angle, the angles being measured normal to the center line of the drill. In operation, the drill is used to provide a bore hole in a workpiece, the bore hole having a predetermined perimeter. As the rotating drill contacts the workpiece, the cutting edges contact the workpiece in a predetermined, progressive manner which thereby creates a plurality of spaced apart circular notches of differing depth in the workpiece. The result is controlled, easily managed removal of chips of the material cut from the workpiece.

12 Claims, 2 Drawing Sheets

DRILL TOOL

BACKGROUND OF THE INVENTION

1. Field of the Invention

The present invention relates to rotary material removing tools, and more particularly to a drill having a pair of forwardly mounted cutting inserts, each cutting insert being set at a predetermined angle with respect to the center axis of the drill so that selected portions of each cutting edge of each cutting insert make progessive contact with a workpiece so as to facilitate material cutting and chipping during a drilling operation thereon.

2. Description of the Prior Art

It is well known in the prior art to construct rotary material removing tools, or drills, of general cylindrical shape. One end of the drill, designated herein as the rearward end, is structured to removably interconnect with a torque transmitting machine, such as a drilling, boring or milling machine. The other end of the drill, designated herein as the forward end, is structured to carry a removably mounted cutting tool bearing a pair of diametrically opposed cutting edges. These cutting edges physically contact the workpiece so as to perform the actual material removal therefrom. The forward end of the drill is more particularly structured with a slot oriented transverse to the center, or cylindrical, axis of the drill for receiving the cutting tool, and bores are provided in both the cutting tool and the slot for receiving screws for retaining the cutting tool in the slot. The drill is still more particularly structured to include grooves adjacent each cutting edge, each groove extending a predetermined distance parallel to the center axis of the drill from the respective cutting edge. These grooves serve to facilitate material removal as the drill engages the workpiece. An example of such a drill is described in U.S. Pat. No. 4,493,596 to Grunsky et al., dated Jan. 15, 1985.

While it is the case that the aforesaid drill is effective at removing material, there remains the problem of efficient removal of material during the drilling operation. Accordingly, what is needed is a drill which is structured for both effective cutting of material and efficient removal of the cuttings during the drilling operation.

SUMMARY OF THE INVENTION

The present invention is a drill which both effectively cuts material of a workpiece and also efficiently manages removal of the cut material.

A drill is provided having a generally cylindrically shaped body. The body has a rear end structured to releasably connect with a torque transmitting machine in a conventional manner. The body has a forward end which is provided with diametrically opposed seats. Each seat releasably retains a cutting insert. Each cutting insert has a cutting edge projecting forwardly from the forward end of the body. Further, the cutting inserts are oriented so that one cutting edge is at a ten degree positive lead angle and the other cutting edge is at a five degree negative lead angle, the angles being measured normal to the center line of the drill.

In operation, the drill is used to provide a bore hole in a workpiece, the bore hole having a predetermined perimeter. As the rotating drill contacts the workpiece, the outboard corner of the cutting edge having a positive lead angle removes material at a location within the outside diameter of the bore hole being formed, thereby producing a first circular notch in the workpiece. As the drill further indexes toward the workpiece, the inboard corner of the cutting edge having a negative lead angle removes material near the center of the bore hole being formed, thereby producing a second circular notch in the workpiece. As the drill still further indexes toward the workpiece, progessively more of each of the cutting edges engage the workpiece. Eventually, the outboard corner of the cutting edge having a negative lead angle engages the workpiece at the location of the bore perimeter of the bore hole being formed, thereby producing a third circular notch in the workpiece. As the drill still further indexes toward the workpiece, the inboard corner of the cutting edge having a positive lead angle engages the workpiece adjacent the center of the bore hole being formed. As the aforesaid circular notches advance to the opposite side of the workpiece, chips break loose which are quite easily removed from the vicinity of the cutting edges of the drill. Thus, the size, position and relative orientation of the cutting edges permit the drill to cut into the workpiece in a unique manner which thereby creates a plurality of spaced apart notches of differing depth that provide controlled, easily managed removal of the material cut from the workpiece.

Accordingly, it is an object of the present invention to provide a drill having diametrically opposed cutting surfaces which are each sized, positioned and mutually oriented so as to produce a predetermined pattern of spaced apart notches in the workpiece which thereby cause chips of material of the workpiece to be released in the course of drilling which are thereupon easily washed from the vicinity of the drill, thereby preventing removed workpiece material from potentially interfering with continued cutting action of the cutting surfaces.

Additional objects, advantages, features and benefits of the present invention will become apparent from the following specification.

DETAILED DESCRIPTION OF THE PREFERRED EMBODIMENT

Figure 1:
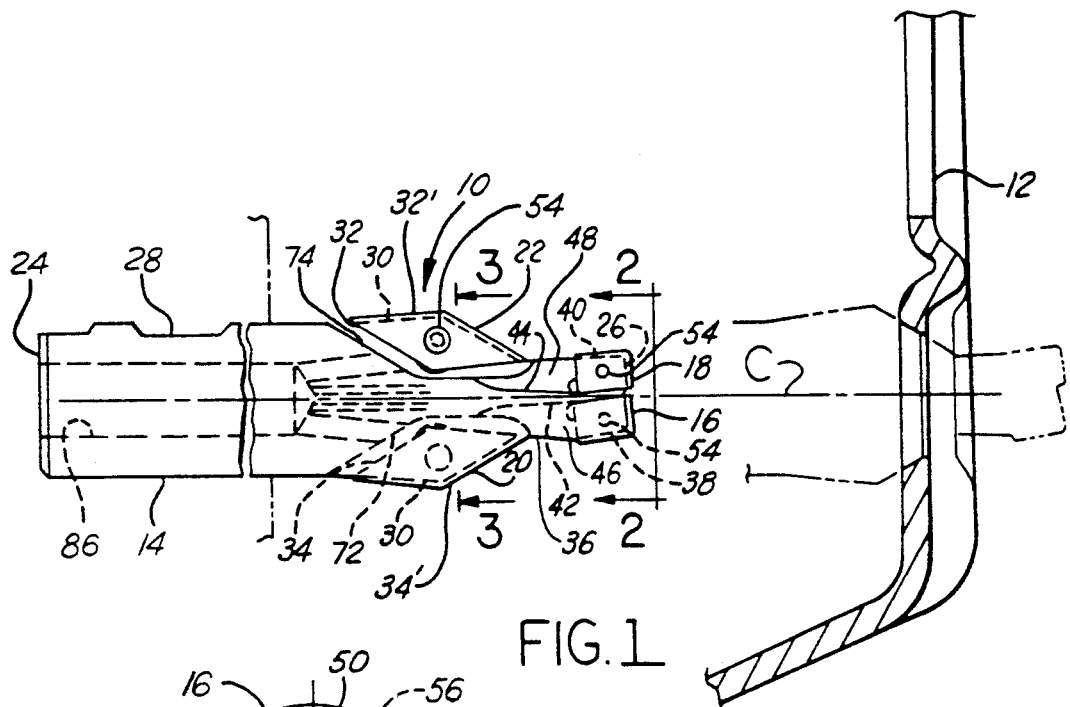
FIG. 1 is a plan view of the drill according to the present invention, where the position of the countersink cutting inserts are shown out of true position for the sake of clarity of depiction. Also shown is the drill according to the present invention in phantom in operation, having just completed a drilling operation on a workpice to form a bore hole having a tapered perimeter.

Referring now to the Drawing, FIG. 1 generally shows the drill 10 according to the present invention, and also depicts a typical environment of its use. This environment of use is the preparation of bore holes in a workpiece 12, specifically lug nut holes in automobile aluminum wheels. Accordingly, the drill 10 includes a body 14, a pair of mutually diametrically opposed bore hole cutting inserts 16, 18, and a pair of mutually diametrically opposed couter-sink cutting inserts 20, 22.

It will be seen by reference to the operational depiction in FIG. 1, that the pair of bore hole cutting inserts 16, 18 are located so as to effect cutting of the bore hole in the wheel for accommodating the shank of a lug, while the pair of counter-sink cutting inserts 20, 22 are tapered so as to effect cutting the seat for the frusto-conical portion of a lug nut. It is to be noted, therefore, that the inclusion of the counter-sink cutting inserts is necessary to this particular example of use, but that other environments of use may or may not require inclusion of the counter-sink cutting inserts 20, 22. While the present description of the preferred embodiment of the present invention pertains specifically to the preparation of automotive aluminum wheels, it is to be understood that the drill 10 according to the present invention is adaptable to the boring of holes in other materials, in other workpieces, with or without the inclusion of a counter-sink at the perimeter of the bore hole.

The body 14 is of a generally elongate cylindrical shape, having a rearward end 24 and a forward end 26. The rearward portion 28 of the body 14 adjacent the rearward end 24 is structured to engageably mate in a conventional manner with a torque producing machine (not shown) for providing rotary movement about a center line C. The central portion 30 of the body 14 is tapered so as to generally follow the shape of the cutting edges 32, 34 of the counter-sink inserts 20, 22. The forward portion 36 of the body 14 adjacent the forward end 26 is of a reduced diameter as compared with that of the rearward end of the body, and terminates in an integrally connected pair of legs 38, 40, the orientation of each of which will be elaborated hereinbelow.

Figure 2:
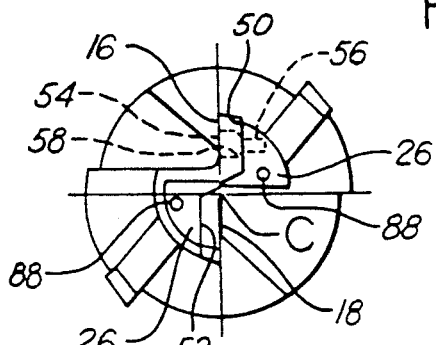
FIG. 2 is an end view of the drill according to the present invention seen along lines 2—2 in FIG. 1, where the counter-sink cutting inserts are shown in their true position.

As can be seen by reference to FIGS. 1 and 2, the forward portion 36 of the body 14 is provided with mutually diametrically opposed grooves 42, 44. Each groove forms a respective shoulder 46, 48 which extends forwardly along respective legs 38, 40. Each shoulder 46, 48 is provided with a respective seat 50, 52 (see FIG. 2) located adjacent the forward end 26 of the body 14. Mounted in each seat 50, 52 is a respective one of the bore hole cutting inserts 16, 18. A set-screw 54 provides fastening of each of the bore hole cutting inserts with respect to its seat, via a threaded bore 56 in each seat and a tapered aperture 58 in the bore hole cutting inserts. The grooves 42, 44 serve to facilitate removal of material from a workpiece as the bore hole cutting inserts 16, 18 engage it, and further serve to provide access for mounting of the bore hole cutting inserts to their respective seats 50, 52.

Figures 9, 10, 11:
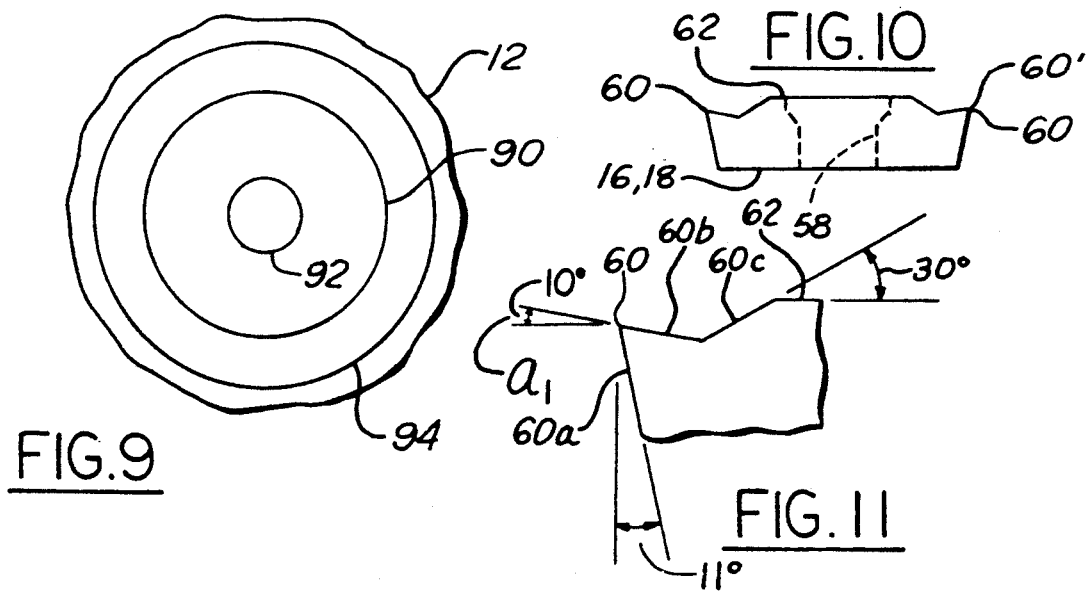
FIG. 9 is a plan view of the circular notches formed in the workpiece as a bore hole is formed therein by the drill according to the present invention along lines 9—9 in FIG. 7.
FIG. 10 is a detail side view of a bore hole cutting inset according to the present invention.
FIG. 11 is a detail side view of the cutting edge of a bore hole cutting insert according to the present invention.

The bore hole cutting inserts 16, 18 are preferred to be each identical and of a rectangular shape. As can be seen by reference to FIG. 10, the cutting edges 60 at each opposite end thereof are each identical and interchangeable, so that as wear of an active cutting edge 60' causes it to become dull or damaged, the other cutting edge may be used as the active cutting edge by simply loosening the set-screw 54, rotating the bore hole cutting insert 180 degrees relative to its seat, and then retightening the set-screw. As can be seen by particular reference to FIG. 11, each cutting edge 60 is preferred formed with a positive rake angle $a_1$ of ten degrees relative to a plane parallel with respect to the leading surface 62 of the bore hole cutting insert, where the leading surface 62 is, itself, preferably, but not necessarily, oriented parallel with respect to the shoulder 46, 48 to which it is respectively mounted. The cutting edge 60 is, itself, provided by the conjunction of a first edge surface 60a that is oriented at 11 degrees with respect to a normal from the leading surface 62, and a second edge surface 60b that is oriented at the 10 degree rake angle describe above. The cutting edge surface 60b terminates a short distance from the cutting edge in a second surface 60c which is oriented at 30 degrees to the leading surface 62. The bore hole cutting insert structure hereinabove described is for a particular application on aluminum, and other rake angles, as well as the shape and mutual orientation of the cutting edge surfaces and second surfaces may vary as determined by a skilled artisan, per a particular drilling application.

Figure 4:
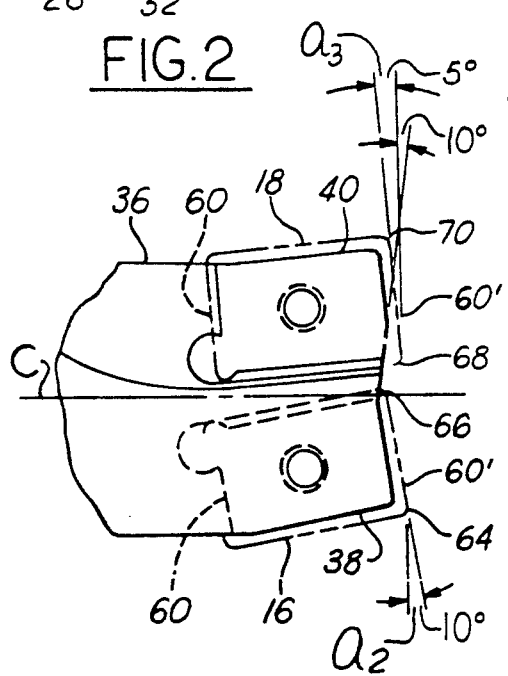
FIG. 4 is a partly sectional detail plan view of the forward end of the drill according to the present invention, showing particularly the bore hole cutting inserts.

As indicated above, the legs 38, 40 are each oriented at a predetermined angle relatvie to the center line C. The precise orientation can be understood by reference now being made to FIG. 4. Each shoulder 46, 48 is oriented parallel with respect to a plane that is parallel to the center line C. Thus, the leading surface 62 of each bore hole cutting insert is also oriented in a plane parallel to the center line C. Leg 38 is oriented to provide a positive lead angle $a_2$ of 10 degrees relative to a normal of the center line C. Leg 40 is oriented to provide a negative lead angle $a_3$ of 5 degrees relative to a normal of the center line C, where angles $a_2$ and $a_3$ each are measured normal to the center line C in a plane parallel with respect to shoulders 46, 48. Those skilled in the art will recognize that angles $a_2$ and $a_3$ may be any measure of degrees which will facilitate cutting of the workpiece 12 as generally described herein. Seat 50, located in leg 38 is also oriented at angle $a_2$ so that cutting edge 60 of bore hole cutting insert 16 is also oriented at angle $a_2$. Seat 52, located in leg 40 is also oriented at angle $a_3$ so that cutting edge 60 of bore hole cutting insert 18 is also oriented at angle $a_3$. The forward end 26 of the body 14 is structured so that everywhere the active cutting edge 60' of each bore hole cutting insert 16, 18 projects forwardly therefrom. Thusly, only the active cutting edges 60' can contact a workpiece during a drilling operation. With respect to bore hole cutting insert 16, the outboard cutting edge corner 64 is forward of the inboard cutting edge corner 66, and the inboard cutting edge corner 66 is located proximate to the location of the center line C. With respect to bore hole cutting insert 18, the inboard cutting edge corner 68 is forward of the outboard cutting edge corner 70, and the inboard cutting edge corner 68 is displaced a short distance radially away from the center line C and the inboard cutting edge corner 66. Further, outboard cutting edge corner 64 is slightly forward, but not necessarily so, of inboard cutting edge corner 68. Those skilled in the art will recognize that the relationship of the outboard cutting edge corner 64 to the inboard cutting edge corner 68 is governed by the chip width designated by the operator of the drill 10. Each of the aforesaid structural aspects provide for the production of chips from the workpiece 12 that is being drilled which are very easily managed, as will be detailed in the operational description hereinbelow.

Figure 3:
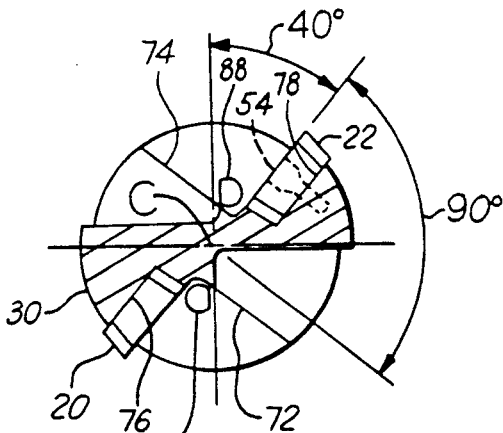
FIG. 3 is an end view of the drill according to the present invention seen along lines 3—3 in FIG. 1, where the counter-sink cutting inserts are shown in their true position.
Figure 5:
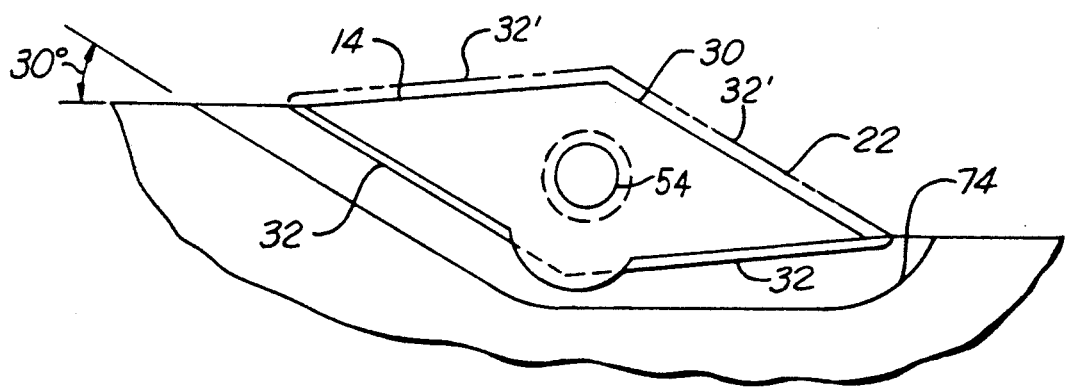
FIG. 5 is a detail side view of a counter-sink cutting insert of the drill according to the present invention.
Figures 6, 7, 8:
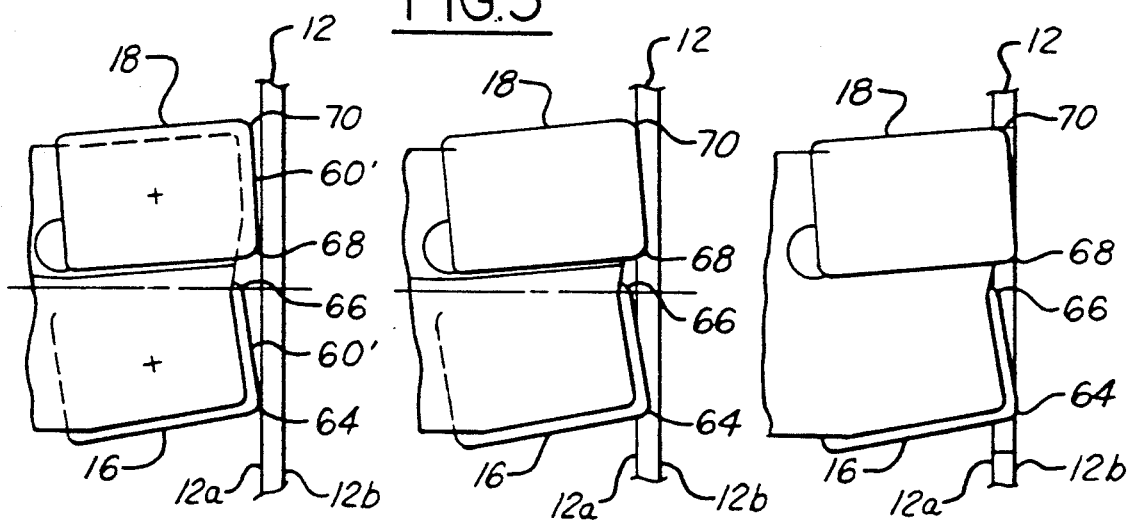
FIGS. 6 through 8 are detail, partly sectional plan views showing the bore hole cutting inserts in operation forming a bore hole in a workpiece.

Now with reference to FIGS. 1, 3 and 5, the drill 10 will be further elaborated relative to its provision for counter-sinking the bore hole. A pair of mutually diametrically opposed second grooves 72, 74 is provided in the central portion 30 of the body 14. Each groove provides a respective second shoulder 76, 78 which is oriented parallel with respect to the center line C. It is preferred, but not necessary, for the pair of second grooves 72, 74 to be rotated about the center axis C relative to the pair of grooves 42, 44 by some number of degrees, preferably 40 degrees. A second seat 76, 78 is provided in each second shoulder for receiving a respective one of the counter-sink cutting inserts 20, 22. Each counter-sink cutting insert 20, 22 is removably secured to its respective second seat 76, 78 as described hereinabove via a set-screw 54. The construction of the counter-sink cutting inserts 20, 22 is depicted particularly in FIG. 5. Each is of a diamond shape having cutting edges 32, 34 structured as hereinabove described with respect to the cutting edges of the bore hole cutting inserts 16, 18. Each counter-sink cutting insert 20, 22 may be rotated 180 degrees as hereinabove described with respect to the bore hole cutting inserts as the active cutting edge 32', 34' becomes dull or damaged. While the profile of the body 14 may follow generally the shape of the counter-sink cutting edges, it is to be understood that the active cutting edges 32', 34' extend radially beyond the body 14, so that during a cutting operation only the active cutting edges will contact the workpiece. The second grooves 72, 74 serve to facilitate removal of material from a workpiece as the counter-sink cutting inserts 20, 22 engage it, and further serve to provide access for mounting of the counter-sink cutting inserts to their respective second seats 76, 78.

It is preferred that the body 14 be constructed to include a hollow internal channel 86 which communicates with lubrication orifices 88 in the body adjacent each of the bore hole cutting inserts 16, 18 and each of the counter-sink cutting inserts 20, 22.

All components of the drill 10 are composed of materials well known in the art of machine tools for the purpose of suitably cutting a workpiece composed of a selected material.

Operation of the drill 10 according to the present invention will now be detailed with particular reference being made to FIGS. 6 through 9.

The drill 10 is used to provide a bore hole in a workpiece, the bore hole having a predetermined bore perimeter, with the bore perimeter being countersunk on one side. As the rotating drill contacts a frontal side 12a of the workpiece 12, the outboard cutting edge corner 64 of the active cutting edge 60' of the bore hole cutting insert 16 having a positive lead angle removes material at a location within the bore diameter of the bore hole being formed, thereby producing a first circular notch 90 in the workpiece 12. As the drill further indexes toward the workpiece, the inboard cutting edge corner 68 of the active cutting edge 60' of the bore hole cutting insert 18 having a negative lead angle removes material near the center of the bore hole being formed, thereby producing a second circular notch 92 in the workpiece 12. As the drill still further indexes toward the workpiece, progressively more of each of the cutting edges engage the workpiece. Eventually, the outboard cutting edge corner 70 of the active cutting edge 60' of the bore hole cutting insert 18 having a negative lead angle engages the workpiece at the location of the bore perimeter of the bore hole being formed, thereby producing a third circular notch 94 in the workpiece 12. As the drill still further indexes toward the workpiece, the inboard cutting edge corner of the active cutting edge 60' of the bore hole cutting insert 16 having a positive lead angle engages the workpiece adjacent the center of the bore hole being formed. As the aforesaid circular notches 90, 92 and 94 deepen toward the rear side 12b of the workpiece 12, chips defined by the notches progressively break loose in the order of the deepest notch first. These chips are then quite easily washed by fluid from the lubrication orifices 88 from the vicinity of the cutting edges of the drill. Thus, the size, position and relative orientation of the active cutting edges 60' permit the drill to cut into the workpiece thereby creating a plurality of spaced apart notches of differing depth that provide progressive, controlled and easily managed removal of the material being removed from the workpiece.

As the drill still further advances toward the workpiece, the active counter-sink cutting edges 32', 34' will contact the perimeter of the bore hole that has just been made, resulting in a tapered perimeter of a predetermined depth and angle as required for the particular application.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A drill tool for use in connection with a torque producing machine that provides rotary motion, said drill tool comprising: a body having a rearward end and a forward end, said body further having a center line oriented axially between said forward end and said rearward end, said rearward end of said body being structured to connect with the torque producing machine so that said body will rotate about said center line;

a first leg integrally connected with said forward end of said body, said first leg being defined by a first groove in said body, said first groove further defining a first shoulder on said first leg, said first shoulder being oriented in a plane parallel with said center line, said first leg being oriented so as to have a positive lead angle of substantially ten degrees relative to a normal of said center line;

a first seat formed in said first shoulder adjacent said forward end of said body;

a first bore hole cutting insert seated in said first seat, said first bore hole cutting insert having a cutting edge oriented parallel with said positive lead angle, said cutting edge of said first bore hole cutting insert projecting from said forward end of said body as said first leg, said cutting edge further having a first outboard cutting edge corner and a first inboard cutting edge corner, said first outboard cutting edge corner being positioned forward along said center line with respect to said first inboard cutting edge, said first inboard cutting edge corner being located substantially proximate to the location of said center line;

a second cutting leg integrally connected with said forward end of said body, said second leg being defined by a second groove in said body located mutually diametrically opposite said first shoulder, said second shoulder being oriented in a plane parallel with said center line, said second leg being oriented so as to have a negative lead angle of substantially five degrees to a normal of said center line, each of said first and second shoulders oriented parallel with respect to a first plane that is parallel to said center line;

a second seat formed in said second shoulder adjacent said forward end of said body; and a second bore hole cutting insert seated in said second seat, said second bore hole cutting insert having a cutting edge oriented parallel with said negative lead angle, said cutting edge of said second bore hole cutting insert projecting from said forward end of said body at said second leg, said second bore hole cutting insert further having a second outboard cutting edge corner and a second inboard cutting edge corner, said second inboard cutting edge corner being postioned forward along said center line with respect to said second outboard cutting edge corner, said second inboard cutting edge corner being displaced radially away for said center line and from said first inboard cutting edge corner and said first outboard cutting edge corner is located forward along said center line of said second inboard cutting edge corner;

a third groove in said body, said third groove defining a third shoulder on said body between said forward and rearward ends thereof, said third shoulder being oriented in a plane parallel with respect to said center line;

a third seat formed in said third shoulder;

a first counter-sink cutting insert seated in said third seat, said first counter-sink cutting insert having a cutting edge for cutting a counter-sink, said cutting edge of said first counter-sink cutting insert projecting from said body;

a fourth groove in said body, said fourth groove defining a fourth shoulder on said body between said forward and rearward ends thereof, said fourth shoulder being located mutually diametrically opposite said third shoulder, said fourth shoulder being oriented in a plane parallel with respect to said center line;

a fourth seat formed in said fourth shoulder; and a second counter-sink cutting insert seated in said fourth seat, said fourth counter-sink cutting insert having a cutting edge for cutting a corner-sink, said cutting edge of said fourth counter-sink cutting insert projecting from said body.

2. The drill tool of claim 1, wherein each of said first and second bore hole cutting inserts is mutually identical.

3. The drill tool of claim 2, wherein each of said first and second bore hole cutting inserts is provided with two selectively interchangeable cutting edges.

4. The drill tool of claim 3, wherein each of said cutting edges of said bore cutting inserts has a positive rake angle.

5. The drill tool of claim 4, wherein said body is provided with a hollow internal channel, said body further being provided with a plurality of lubrication orifices, a lubrication orifice being located adjacent each of said bore hole cutting inserts and each of said counter-sink cutting inserts, said hollow internal channel fluidically communicating with each of said lubrication orifices.

6. The drill tool of claim 1, wherein said first and second planes are mutually rotated substantially 40 degrees about said center line.

7. The drill tool of claim 6, wherein said first counter-sink cutting insert is removably connected to said third seat, and said second counter-sink cutting insert is removably connected to said fourth seat.

8. The drill tool of claim 7, wherein each of said first and second counter-sink cutting inserts is mutually identical.

9. The drill tool of claim 8, wherein each of said first and second counter-sink cutting inserts is provided with two selectively interchangeable cutting edges.

10. The drill tool of claim 9, wherein each of said cutting edges of said counter-sink cutting inserts has a positive rake angle.

11. The drill tool of claim 10, wherein said body is provided with a hollow internal channel, said body further being provided with a plurality of lubrication orifices, a lubrication orifice being located adjacent each of said bore hole cutting inserts and each of said counter-sink cutting inserts, said hollow internal channel fluidically communicating with each of said lubrication orifices.

12. A drill tool for use in connection with a torque producing machine that provides rotary motion, said drill tool comprising:

a body having a rearward end and a forward end, said body further having a center line oriented axially between said forward end and said rearward end, said rearward end of said body being structured to connect with the torque producing machine so that said body will rotate about said center line;

a first leg integrally connected with said forward end of said body, said first leg being defined by a first groove in said body, said first groove further defining a first shoulder on said first leg, said first shoulder being oriented in a plane parallel with said center line, said first leg being oriented so as to have a positive lead angle of substantially ten degrees relative to a normal of said center line;

a first seat formed in said first shoulder adjacent said forward end of said body;

a first bore hole cutting insert seated in said first seat, said first bore hole cutting insert having a cutting edge oriented parallel with said positive lead angle, said cutting edge of said first bore hole cutting insert projecting from said forward end of said body at said first leg;

a second leg integrally connected with said forward end of said body, said second leg being defined by a second groove in said body located mutually diametrically opposite said first groove, said second groove further defining a second shoulder on said second leg, said second shoulder being located mutually diametrically opposite said first shoulder, said second shoulder being oriented in a plane parallel with said center line, said second leg being oriented so as to have a negative lead angle of substantially five degrees relative to a normal of said center line, wherein each of said first and second shoulders is oriented parallel with respect to a plane that is parallel to said center line;

a second seat formed in said second shoulder adjacent said forward end of said body;

a second bore hole cutting insert seated in said second seat, said second bore hole cutting insert having a cutting edge oriented parallel with said negative lead angle, said cutting edge of said second bore hole cutting insert projecting from said forward end of said body at said second leg;

a third groove in said body, said third groove defining a third shoulder on said body between said forward and rearward ends thereof, said third shoulder being oriented in a plane parallel with respect to said center line;

a third seat formed in said third shoulder;

a first counter-sink cutting insert seated in said third seat, said first counter-sink cutting insert having a cutting edge for cutting a counter-sink, said cutting edge of said first counter-sink cutting insert projecting from said body;

a fourth groove in said body, said fourth groove defining a fourth shoulder on said body between said forward and rearward ends thereof, said fourth shoulder being located mutually diametrically opposite said third shoulder, said fourth shoulder being oriented in a plane parallel with respect to said center line;

a fourth seat formed in said fourth shoulder; and a second counter-sink cutting insert seated in said fourth seat, said fourth counter-sink cutting insert having a cutting edge for cutting a counter-sink, said cutting edge of said fourth counter-sink cutting insert projecting from said body.

* * * * *